United States Patent
Iamsaard et al.

(10) Patent No.: US 12,282,138 B2
(45) Date of Patent: Apr. 22, 2025

(54) OPHTHALMIC LENS COMPRISING AN OXAZOLONE

(71) Applicant: Essilor International, Charenton-le-pont (FR)

(72) Inventors: Supitchaya Iamsaard, Bangkok (TH); Pierre Fromentin, Bangkok (TH)

(73) Assignee: Essilor International, Charenton-le-pont (FR)

( * ) Notice: Subject to any disclaimer, the term of this patent is extended or adjusted under 35 U.S.C. 154(b) by 911 days.

(21) Appl. No.: 17/312,469

(22) PCT Filed: Dec. 11, 2019

(86) PCT No.: PCT/EP2019/084579
§ 371 (c)(1),
(2) Date: Jun. 10, 2021

(87) PCT Pub. No.: WO2020/120540
PCT Pub. Date: Jun. 18, 2020

(65) Prior Publication Data
US 2022/0146712 A1    May 12, 2022

(30) Foreign Application Priority Data
Dec. 13, 2018 (EP) .................... 18306682

(51) Int. Cl.
| | | |
|---|---|---|
| *G02B 1/04* | (2006.01) |
| *C08F 2/04* | (2006.01) |
| *C08F 2/44* | (2006.01) |
| *C08F 2/50* | (2006.01) |
| *C08K 5/353* | (2006.01) |
| *C08K 9/10* | (2006.01) |
| *G02B 3/00* | (2006.01) |
| *G02C 7/10* | (2006.01) |
| *B82Y 20/00* | (2011.01) |
| *B82Y 30/00* | (2011.01) |
| *B82Y 40/00* | (2011.01) |

(52) U.S. Cl.
CPC ............... *G02B 1/041* (2013.01); *C08F 2/04* (2013.01); *C08F 2/44* (2013.01); *C08F 2/50* (2013.01); *C08K 5/353* (2013.01); *C08K 9/10* (2013.01); *G02B 3/0012* (2013.01); *G02C 7/10* (2013.01); *B82Y 20/00* (2013.01); *B82Y 30/00* (2013.01); *B82Y 40/00* (2013.01); *C08K 2201/011* (2013.01)

(58) Field of Classification Search
CPC ..................................................... G02B 1/041
See application file for complete search history.

(56) References Cited

U.S. PATENT DOCUMENTS

| 8,360,574 B2 | 1/2013 | Ishak et al. |
| 2006/0124017 A1 | 6/2006 | Adam et al. |
| 2016/0304701 A1 | 10/2016 | Kakinuma et al. |

FOREIGN PATENT DOCUMENTS

| EP | 3296775 B1 | 3/2018 |
| JP | 2006524728 | 11/2006 |
| JP | 2018533082 | 11/2020 |
| WO | WO 2018029540 B3 | 2/2018 |

OTHER PUBLICATIONS

Baker et al., "New light shifters for solar energy converters", *Functional Materials*, 9(4):727-731, 2002.
International Search Report issued in International application No. PCT/EP2019/084579, mailed Feb. 7, 2020.
Office Action issued in corresponding Chinese Application No. 2022512222, dated Jan. 20, 2023.

*Primary Examiner* — Shawquia Jackson
(74) *Attorney, Agent, or Firm* — Norton Rose Fulbright US LLP (57) ABSTRACT

The present invention relates to ophthalmic lenses comprising an oxazolone, a preparation method thereof and the use of an oxazolone in an ophthalmic lens to absorb blue light.

20 Claims, 2 Drawing Sheets

OPHTHALMIC LENS COMPRISING AN OXAZOLONE

CROSS-REFERENCE TO RELATED APPLICATIONS

This application is a national phase application under 35 U.S.C. § 371 of International Application No. PCT/EP2019/084579 filed 11 Dec. 2019, which claims priority to European Patent Application No. 18306682.8 filed 13 Dec. 2018. The entire contents of each of the above-referenced disclosures is specifically incorporated by reference herein without disclaimer.

TECHNICAL FIELD

This disclosure relates generally to ophthalmic lenses comprising an oxazolone, a preparation method thereof and the use of an oxazolone in an ophthalmic lens to absorb blue light.

BACKGROUND

Light that reaches and enters the human eye is divided into visible light, comprising wavelengths from about 380 to 780 nm, and non-visible light, which includes light in the ultraviolet range (UV-A and UV-B light from about 280 to 380 nm) and the infrared range (Near IR light from about 780 to 1400 nm).

UV light is known to be harmful to the human eye. In particular, it can accelerate ocular ageing which can lead to an early cataract or to more extreme disorders such as photokeratitis or «snow blindness».

Blue light, also known as high-energy visible (HEV) light, corresponds to visible light in the blue-violet band between 380 and 500 nm. Prolonged exposure to blue light emitted from digital devices such as television, laptops, tablets and smartphones and fluorescent and LED lighting is harmful as blue light is able to reach the retina. Some specific ranges of blue light have been shown to cause photoretinitis; digital eyestrain, or computer vision syndrome which includes blurry vision, difficulty focusing, dry and irritated eyes, headaches, neck and back pain; disruption of the circadian rhythm; decreased melanin production; age-related macular degeneration; glaucoma; retinal degenerative diseases; breast and prostate cancer; diabetes; heart disease; obesity and depression. Blue light in the range from about 420 to 450 nm is believed to be especially harmful.

Damages from UV light and blue light can be prevented by incorporating light-absorbing additives in ophthalmic lenses.

Three different methods can be used to prepare light-absorbing ophthalmic lenses. The first method is the impregnation of a polymerized lens in a bath containing a light-absorbing additive. However, this method adds a step to the production process of the lens, which is not desirable in terms of cost and time.

The second method is the coating of a substance capable of absorbing light rays onto the surface of ophthalmic lenses. However, the incorporation of high amounts of light-absorbing additives in a coating weakens its mechanical properties.

The third method is the incorporation of a light-absorbing additive in the bulk liquid formulation (i.e. before polymerization). However, the incorporation of high amounts of light-absorbing additives in the bulk can lead to undesirable yellowing as well as compatibility issues and degradation of mechanical properties.

Nowadays, the best commercial compounds for use in lenses are benzotriazoles and benzophenones. The main problem associated with commercial compounds stems from the fact that their spectral properties are not well adapted to blue cut use: typically their maximum absorption wavelength (Amax) is lower than that would be necessary to achieve significant extinction within blue-cut range. Indeed, most of the products available on the market exhibit a maximum absorption wavelength (Amax) below or equal to 350 nm, leading to very poor or no absorption at 400 nm and over.

Such mismatch between spectral properties and application in blue cut leads to two consequences:
- when blue cutting molecules are introduced in a volume having a thin dimension such as film or coating, the concentration required to reach blue cut makes it unpractical or not feasible;
- when blue cutting molecules are introduced in the bulk, the concentration required to reach blue cut may cause compatibility issues such as blooming (the additive migrates out of the lens during polymerization and causes surface defects) or degradation of the thermo-mechanical properties of the matrix.

There is thus a need for blue cutting molecules that are efficient in low amounts to limit degradation of the mechanical properties of the polymer matrix and compatibility issues.

The Applicant has found that this need could be met with an ophthalmic lens comprising an oxazolone as a light absorbing additive. Indeed, oxazolones may have a maximum wavelength absorption of from 350 to 400 nm and can therefore be used to absorb blue light more efficiently than benzotriazoles and benzophenones.

Further, ophthalmic lens comprising an oxazolone in sufficient amount to absorb blue light exhibit a lower yellow index than that of commercial lens comprising a conventional benzotriazole.

Since oxazolones are more efficient for blue light cutting applications, the amount of light absorber that needs to be introduced in the lens is reduced, so that migration of light absorber at the surface of the lens during polymerization is minimized, resulting in lower contamination of mold surfaces and eventually eliminating the need to clean molds between successive uses.

In addition, substrates comprising low amounts of oxazolones will exhibit enhanced thermo-mechanical properties, because the mechanical properties of a substrate are usually improved when additives and/or adjuvants are used in lower amount.

Further, oxazolones can also be used in thin dimension applications such as light-filtering coatings, hardcoats, films and laminates. Additionally, oxazolones can be encapsulated in nanoparticles and lead to reduced yellowing in allylic matrixes requiring high amounts of catalyst to initiate polymerization.

Last, there is also a need for molecules that are efficient to filter a limited range of visible light, so as to protect wearer from harmful light or to improve vision of wearer, in particular to improve colour perception, contrast or colour discrimination (for colour blind wearers).

SUMMARY

A first object of the present invention is an ophthalmic lens comprising:

a plastic base, and an oxazolone, wherein the oxazolone is represented by the following formula (I):

wherein A, $R_1$, $R_2$, n and m are as defined herein.

Another object of the present invention is a process for preparing the ophthalmic lens of the invention, comprising the steps of:

a) providing monomers or oligomers from which the plastic base can be prepared;

b) mixing the monomers or oligomers, the oxazolone and a catalyst suitable for the polymerization of the monomers and oligomers to form a polymerizable liquid composition;

c) curing the polymerizable liquid composition.

Yet another object of the present invention is the use of an oxazolone as defined herein in an ophthalmic lens to absorb blue light.

DETAILED DESCRIPTION

Ophthalmic Lens

The present invention relates to an ophthalmic lens.

As used herein, the term "ophthalmic lens" refers to any type of lens intended to be supported by a wearer's face, which may be for purposes of improving or enhancing visual acuity, for protecting against the environment, for fashion, or for adornment. The term may refer to ophthalmic lenses, such as non-corrective lenses (also called plano lenses), semi-finished lens blanks, and corrective lenses, such as progressive addition lenses, unifocal or multifocal lenses. Further examples of ophthalmic lens include electronic lens, virtual reality (VR) lens, augmented reality lenses (AR) and the like.

The ophthalmic lens of the present invention comprises an oxazolone.

As used herein, the term "oxazolone" is intended to mean a compound comprising a five-membered ring having one nitrogen ring atom, one oxygen ring atom and three carbon ring atoms, wherein one of the carbon ring atoms is substituted with an oxo group (=O) and wherein one of the carbon ring atoms is linked to a nitrogen ring atom with a double bond. As such, the five-membered ring is in the maximum state of insaturation.

The oxazolone is represented by the following formula (I):

wherein

A is a 5-membered ring selected from one of the following:

each $R_1$ is independently selected from halogen, $(C_{2-6})$alkyl, $(C_{1-6})$haloalkyl, —OH, —OR, —NH$_2$, —NH($(C_{1-6})$alkyl), —N($(C_{1-6})$alkyl)$_2$, —NO$_2$, —CN, —NH—C(O)—$(C_{1-6})$alkyl and —O—C(O)—$(C_{1-6})$alkyl; preferably each $R_1$ is independently selected from Cl, Br, F, —CF$_3$, —OH, —OCH$_3$, —NH$_2$, —N(CH$_3$)$_2$, —CH$_3$, —C$_2$H$_5$, —NO$_2$, —CN, and —O—C(O)—CH$_3$;

each $R_2$ is independently selected from halogen, $(C_{1-6})$alkyl, $(C_{1-6})$haloalkyl, —OH, —OR, —NH$_2$, —NH($(C_{1-6})$alkyl), —N($(C_{2-6})$alkyl)$_2$, —NO$_2$, —CN, —NH—C(O)—$(C_{2-6})$alkyl and —O—C(O)—$(C_{1-6})$alkyl; preferably each $R_2$ is independently selected from Cl, Br, F, —CF$_3$, —OH, —OCH$_3$, —NH$_2$, —N(CH$_3$)$_2$, —CH$_3$, —C$_2$H$_5$, —NO$_2$, —CN, and —O—C(O)—CH$_3$;

R is $(C_{1-6})$alkyl or $(C_{1-6})$haloalkyl;

n is 0, 1, 2, 3, 4 or 5; and m is 0, 1, 2, 3, 4 or 5.

In one embodiment, the oxazolone may be represented by the following formula (II) or (III):

(II)

(III)

wherein $R_1$, $R_2$, n and m are as defined above.

In a preferred embodiment, the oxazolone may be represented by formula (II), wherein $R_1$, $R_2$, n and m are as defined above.

In particular, the oxazolone may be represented by formula (I), (II) or (III), wherein each $R_2$ is independently selected from Cl, F, —$CF_3$, $NO_2$, —OH and —$OCH_3$, preferably selected from Cl, F and $CF_3$;

n is 0; and m is 0, 1 or 2, preferably 0 or 1.

In a preferred embodiment, the oxazolone may be represented by formula (II), wherein each $R_2$ is independently selected from Cl, F, —$CF_3$, $NO_2$, —OH and —$OCH_3$, preferably selected from Cl, F and $CF_3$;

n is 0; and m is 0, 1 or 2, preferably 0 or 1.

In a particularly preferred embodiment, the oxazolone may be represented by one of the following formula (IVa)-(IVk):

(IVa)

(IVb)

(IVc)

(IVd)

(IVe)

(IVf)

Substituted oxazolones of formula (II) may be obtained according to the following scheme:

In formulae (I), (II), (III), (IVa)-(IVk) indicated above, the stereochemistry of the exocyclic carbon-carbon double bond has not been specified and is represented by a wavy line. In one embodiment, the stereochemistry of the exocyclic carbon-carbon double bond is (Z), (E) or a mixture thereof. Preferably, the stereochemistry of the exocyclic carbon-carbon double bond is (Z).

The oxazolone of the ophthalmic lens of the invention may exhibit a significant absorption in the range of blue light. In particular, the oxazolone may have a maximum absorption wavelength (λmax) lower than 400 nm. More particularly, the oxazolone may have a maximum absorption wavelength in the range of 350 to 400 nm, preferably 360 to 390 nm. In another embodiment, the oxazolone may have a maximum absorption wavelength (λmax) in the range of 420 to 500 nm, allowing for selective absorption of blue light, desirable for colouring properties or colour balancing properties. The λmax of the oxazolone may be measured on a 10 ppm solution of the oxazolone in ethanol.

(II)

Triazine 1 may be reacted with morpholine 2 to form compound 3 as an organic salt. Compound 3 may then be reacted with a derivative of hippuric acid 4 to form compound 5. Compound 5 may then be reacted with a benzaldehyde derivative 6 to form an oxazolone of formula (II).

The ophthalmic lens of the invention further comprises a plastic base.

As used herein, the term "plastic base" refers to a bare ophthalmic substrate such as an unfinished, untreated, or uncoated ophthalmic lens.

Preferably, the plastic base of the ophthalmic lens of the invention is transparent. As used herein, the term "transparent" is intended to mean a material having a transmission greater than 85%, preferably greater than or equal to 90%.

The refractive index of the plastic base may be in the range from about 1.4 to about 1.9, such as about 1.5 to about 1.9, about 1.6 to about 1.9, about 1.7 to about 1.9, about 1.8 to about 1.9, about 1.4 to about 1.8, about 1.4 to about 1.7, about 1.4 to about 1.6, about 1.45 to about 1.85, about 1.45 to about 1.75, or about 1.5 to about 1.7.

The plastic base of the ophthalmic lens of the invention may be any conventional optical substrate known in the art. In particular, the plastic base may be chosen from a thermoplastic resin, such as a polyamide, polyimide, polysulfone, polycarbonate, polyethylene terephthalate, poly(methyl(meth)acrylate), cellulose triacetate or copolymers thereof, or is chosen from a thermosetting resin, such as a cyclic olefin copolymer, a homopolymer or copolymer of allyl esters, a homopolymer or copolymer of allyl carbonates of linear or branched aliphatic or aromatic polyols, a homopolymer or copolymer of (meth)acrylic acid and esters thereof, a homopolymer or copolymer of thio(meth)acrylic acid and esters thereof, a homopolymer or copolymer of urethane and thiourethane, a homopolymer or copolymer of epoxy, a homopolymer or copolymer of sulphide, a homopolymer or copolymer of disulphide, a homopolymer or copolymer of episulfide, a copolymer of polythiol and polyisocyanate, and combinations thereof.

In one embodiment, the plastic base may comprise a copolymer of at least one polythiol and a polyisocyanate; preferably a copolymer of xylylene diisocyanate and 1,2-bis[(2-mercaptoethyl)thio]-3-mercaptopropane or a copolymer of bis(isocyanatomethyl)bicyclo[2.2.1]heptane, pentaerythritol tetrakis(3-mercaptopropionate) and 1,2-bis[(2-mercaptoethyl)thio]-3-mercaptopropane or a copolymer of xylylene diisocyanate and 4,8 (or 4,7 or 5,7)-dimercaptomethyl-1,11-dimercapto-3,6,9-trithiaundecane.

In another embodiment, the plastic base may be a copolymer of an allyl monomer or allyl oligomer, such as diethylene glycol bis(allyl carbonate), ethylene glycol bis(allyl carbonate), oligomers of diethylene glycol bis(allyl carbonate), oligomers of ethylene glycol bis(allyl carbonate), bisphenol A bis(allyl carbonate) or diallylphthalates, and a second monomer or oligomer that is capable of polymerizing with the allyl monomer or oligomer, such as aromatic vinyl compounds alkyl mono(meth)acrylates, di(meth)acrylates, tri(meth)acrylates or tetra(meth)acrylates.

In the ophthalmic lens of the invention, the oxazolone may be included in the plastic base or may be included in a separate layer coated on a surface of the plastic base.

As used herein, the separate layer coated on a surface of the plastic base is defined as a coating, which (i) is positioned above the substrate, (ii) is not necessarily in contact with the substrate, that is to say one or more intermediate layers may be arranged between the substrate and the layer in question, and (iii) does not necessarily completely cover the substrate.

The separate layer coated on a surface of the plastic base may be made of any material conventionally used to coat ophthalmic lens. For example, said separate layer may be obtained by polymerization of a (meth)acrylic based coating or a sol-gel based coating or an epoxy based coating or polyurethane based coating.

Preferably, the oxazolone is included in the plastic base of the ophthalmic lens. The oxazolone may be included in the plastic base by dispersion of oxazolone in raw materials (monomers) before polymerization. As such, the oxazolone may be homogeneously dispersed within the plastic base of the ophthalmic lens. Alternatively, the oxazolone may be included in the plastic base by imbibition. A method for imbibition may comprise soaking the plastic base in a bath containing the oxazolone for a determined time, so that the oxazolone may diffuse into the plastic base. As such, the oxazolone may be dispersed into a thin layer at a surface of the plastic base. With imbibition method, the thickness of the plastic base which includes oxazolone does not depend on the global geometry of the ophthalmic lens.

In one embodiment, the oxazolone is included in the plastic base and is represented by formula (II) or (III), preferably formula (II).

In another embodiment, the oxazolone is included in a separate layer coated on a surface of the plastic base and is represented by formula (II) or (III), preferably formula (III).

When the oxazolone is included in the plastic base, the amount of oxazolone is 0.001 to 5%, preferably 0.0025 to 2%, more preferably 0.005 to 1%, even more preferably 0.006 to 0.3%, by weight based on the weight of the plastic base.

When the oxazolone is included in a separate layer coated on a surface of the plastic base, the amount of oxazolone is 0.001 to 5%, preferably 0.0025 to 2%, more preferably 0.005 to 1%, even more preferably 0.006 to 0.3%, by weight based on the weight of the separate layer.

Further, the oxazolone may be encapsulated within nanoparticles. Said nanoparticles may be dispersed within the plastic base of the ophthalmic lens or may be dispersed within a separate layer coated on a surface of the plastic base. Preferably, said nanoparticles are dispersed within the plastic base of the ophthalmic lens, said plastic base comprising a copolymer including an allyl monomer or allyl oligomer as defined above.

The amount of oxazolone in the nanoparticles is from 0.0001 to 90 wt %, in particular 0.01 to 50% wt %, more particularly 0.1 to 10 wt % based on the weight of the nanoparticles.

In the context of the present invention, the term "nanoparticles" is intended to mean individualized particles of any shape having a size, measured in its longest direction, in the range of 1 nm to 10 μm, preferably in the range of 10 nm to 5 μm, as measured by Dynamic Light Scattering.

The nanoparticles may be either polymer-based, i.e. they comprise a polymer, or mineral-based, i.e. they comprise a mineral oxide.

In a preferred embodiment, the polymer or mineral oxide comprised in the nanoparticles is a transparent material.

The ophthalmic lens may further comprise a UV-absorber other than the oxazolone. In one embodiment, the ophthalmic lens may further comprise a benzotriazole UV-absorber or a mixture thereof, preferably a benzotriazole UV-absorber selected from 2-(2-hydroxy-5-tert-octylphenyl)-2H-benzotriazole, 2-(3-tert-butyl-2-hydroxy-5-methylphenyl)-5-chloro-2H-benzotriazole, and mixtures thereof.

The benzotriazole UV-absorber may be included in the plastic base or may be included in a separate layer coated on a surface of the plastic base.

Preferably, the benzotriazole UV-absorber is included in the plastic base when the oxazolone is included in the plastic base or the benzotriazole UV-absorber is included in a separate layer when the oxazolone is included in a separate layer coated on a surface of the plastic base.

Advantageously, the amount of benzotriazole UV-absorber is lower than that is generally necessary to absorb blue light when no oxazolone is present in the ophthalmic lens. When the benzotriazole UV-absorber is included in the plastic base, the total amount of benzotriazole UV-absorber is 0.001 to 2%, in particular 0.01 to 1.5%, more particularly 0.1 to 1.2%, by weight based on the weight of the plastic base. When the benzotriazole UV-absorber is included in a separate layer coated on a surface of the plastic base, the total amount of benzotriazole UV-absorber is 0.001 to 2%, in particular 0.01 to 1.5%, more particularly 0.1 to 1.2%, by weight based on the weight of the separate layer.

The ophthalmic lens may further comprise an additive, in particular a light stabilizer, more particularly an anti-yellowing agent. As used herein, "light stabilizer" is intended to mean an additive that improves light stability of the ophthalmic lens, in particular an additive that limits degradation of the ophthalmic lens properties upon exposure to light, such as ultra-violet light. As used herein, "anti-yellowing agent" is intended to mean an additive that limits yellowing of the ophthalmic lens. Particularly suitable light stabilizers are sulfide anti-yellowing additive such as dialkyl thiodipropionate or dialkyl thiodiglycolate and hindered amine light stabilizer (HALS) such as Tinuvin® 144, Tinuvin® 1130, Tinuvin® 479, Tinuvin® 123 or Hostavin® 3058, or a mixture thereof.

The light stabilizer may be included in the plastic base or may be included in a separate layer coated on a surface of the plastic base.

Preferably, the light stabilizer is included in the plastic base when the oxazolone is included in the plastic base or the light stabilizer is included in a separate layer when the oxazolone is included in a separate layer coated on a surface of the plastic base.

Advantageously, the amount of light stabilizer is 0.001 to 1%, in particular 0.01 to 0.75%, more particularly 0.025 to 0.5%, by weight based on the weight of the plastic base or of the separate layer coated on a surface of the plastic base.

Use of light stabilizer is particularly desirable when the plastic base is prone to yellowing, in particular for a homopolymer or copolymer of allyl carbonates of linear or branched aliphatic or aromatic polyols; or a copolymer of polythiol and polyisocyanate. For the latter (polythiourethanes), use of light stabilizer is desirable for plastic bases with high refractive index around 1.6, and more particularly around 1.67.

As mentioned above, the ophthalmic lens may be manufactured in accordance with wearer specifications and may be processed to provide the ophthalmic lens with various functions. Accordingly, the ophthalmic lens may have a complex structure resulting from interlayering of materials and/or a series of treatments to tailor the ophthalmic lens to specific user requirements. For example, the treatments may be carried out to reduce thickness and to render the ophthalmic lens lightweight, to improve its transparency, for durability, strength and protection, aesthetics etc. It follows that an ophthalmic lens may further comprise one or more coatings disposed on the plastic base in addition to the optional separate layer that may comprise the oxazolone, such as an impact resistant coating, an anti-scratch coating, an anti-reflection coating, a tint coating, a colour coating, an anti-static coating, an anti-smudge coating, a water repellent coating, a polarizing coating, or a photochromic coating.

The ophthalmic lens of the invention may absorb blue light. In particular, the ophthalmic lens may exhibit light cut higher than 402 nm, preferably 407 nm.

In one embodiment, the ophthalmic lens may exhibit light cut from 402 to 420 nm, in particular from 407 to 417 nm.

Alternatively, the ophthalmic lens may exhibit light absorption from 450 to 490 nm, in particular from 460 to 480 nm.

The term "light cut" as used herein refers to the lowest wavelength in UV-visible range for which transmittance through the ophthalmic lens is greater than 1%.

The term "transmittance" as used herein refers to intensity of radiation transmitted through a material over that of the incident radiation, and which is expressed as a percentage. The transmittance of the ophthalmic lens can be measured according to ISO 8980-3-2003.

In one embodiment, the average transmittance of the ophthalmic lens over the range 420-450 nm (noted TmB1%) is less than 85%, for an uncoated lens (i.e. without anti-reflection coating).

Blue light around wavelength of 480 nm is very important for circadian rhythm. In usual conditions, it should not be filtered. In one embodiment, the average transmittance of the ophthalmic lens over the range 465-495 nm (noted TmB2%) is more than 85%, for an uncoated lens (i.e. without anti-reflection coating).

Alternatively, the average transmittance of the ophthalmic lens over the range 465-495 nm (noted TmB2%) is less than 50%, in particular less than 40%, for an uncoated lens (i.e. without anti-reflection coating). Such lens can be used as a color filter.

The ophthalmic lens of the invention may not exhibit undesirable yellowing. In particular, the Yellow Index of light transmitted through said ophthalmic lens may be lower than 10, preferably lower than 7. The Yellow Index of the ophthalmic lens can be measured according to ASTM D-1925.

The invention will now be described in more detail with the following examples which are given for purely illustrative purposes and which are not intended to limit the scope of the invention in any manner.

Process for the Preparation of the Ophthalmic Lens

The ophthalmic lens of the invention may be prepared with a process comprising the steps of:
a) providing monomers or oligomers from which the plastic base can be prepared;

b) mixing the monomers or oligomers, the oxazolone and a catalyst suitable for the polymerization of the monomers and oligomers to form a polymerizable liquid composition;

c) curing the polymerizable liquid composition.

A coating may be deposited or formed through various methods, including wet processing, and film transfer.

In particular, the ophthalmic lens of the invention may be prepared with a wet process comprising the steps of:

a) providing monomers or oligomers from which a coating layer can be prepared;

b) mixing the monomers or oligomers, the oxazolone and a catalyst suitable for the polymerization of the monomers and oligomers to form a polymerizable liquid composition;

c) coating the polymerizable liquid composition on a substrate;

d) curing the polymerizable liquid composition.

Preferably, the curing is a thermal curing.

Alternatively, the ophthalmic lens of the invention may be prepared with a film transfer process comprising the steps of:

a) providing monomers or oligomers from which a coating layer can be prepared;

b) mixing the monomers or oligomers, the oxazolone and a catalyst suitable for the polymerization of the monomers and oligomers to form a polymerizable liquid composition;

c) coating the polymerizable liquid composition on a transfer film;

d) curing the polymerizable liquid composition to obtain a coating layer;

e) transferring the coating layer from the transfer film onto a substrate.

Preferably, the curing is a thermal curing.

Preferably, the coating layer is glued to the substrate by an adhesive layer, such as a UV curable adhesive or a thermally curable adhesive layer or a pressure sensitive adhesive layer.

According to a preferred embodiment, the polymerizable liquid composition may be stirred until homogeneous and subsequently degassed and/or filtered before curing.

The polymerizable liquid composition of the present invention described above may be cast into a casting mold for forming a lens and polymerized by heating at a temperature of from 10 to 150° C., in particular from 15 to 130° C. According to a preferred embodiment, the heating may last for 5 to 24 hours, preferably 7 to 22 hours, more preferably 15 to 20 hours.

The casting mold may then be disassembled and the lens may be cleaned with water, ethanol or isopropanol.

The ophthalmic lens may then be coated with one or more functional coatings selected from the group consisting of an impact resistant coating, an anti-scratch coating, an anti-reflection coating, a tint coating, a colour coating, an anti-static coating, an anti-smudge coating, a water repellent coating, a polarizing coating, or a photochromic coating.

Use of an Oxazolone

The present invention also pertains to the use of an oxazolone as defined above in an ophthalmic lens to absorb blue light.

The absorption of blue light can be assessed by determining the average transmittance of the ophthalmic lens over the range 420-450 nm. Advantageously, the average transmittance of the ophthalmic lens over the range 420-450 nm is less than 85%, for an uncoated lens (i.e. without anti-reflection coating).

The invention will now be described in more detail with the following examples which are given for purely illustrative purposes and which are not intended to limit the scope of the invention in any manner.

MEASURING METHODS

The following measures are carried out on a lens that is 2 mm thick in its center and that has been cleaned with isopropyl alcohol.

The light cut, transmittance, yellow index and colorimetric coefficients of the lens were determined with a spectrophotometer (Cary60).

The light cut, yellow index and TvD65 are measured immediately after manufacture and after accelerated ageing in Q-Sun cell (80 hours of UV light exposition in a Xenon test chamber Q-SUN® Xe-3 from Q-LAB at 23° C. (±5° C.) and 20% (±5%) of relative humidity).

The light cut of the lens is determined under normal incident light by plotting the graph of the transmittance percentage of the lens as a function of the wavelength. The light cut of the material can be read on the graph as the wavelength corresponding to a transmittance of 1%.

The transmittance (TvD65) is determined under normal incident light (standard illuminant D65).

The Yellow Index (YI) is measured according to ASTM D-1925.

The average (or mean) light transmittance over 420-450 nm range (TmB1%) is computed from transmittance curve measured according to ISO 8980-3-2003.

The average (or mean) light transmittance over 465-495 nm range (TmB2%) is computed from transmittance curve measured according to ISO 8980-3-2003.

Colorimetric coefficients of the lenses of the invention are measured according to the international colorimetric system CIE L*a*b* and L*C*H*, i.e. calculated between 380 and 780 nm, taking the standard illuminant D65 at angle of incidence 15° and the observer into account (angle of 10°).

Materials

In the examples, the following compounds are used:

| Function | Chemical | CAS No. | Supplier |
|---|---|---|---|
| Monomer ISO1 (diisocyanate) | bis(isocyanatomethyl) bicyclo[2.2.1]heptane | 74091-64-8 | |
| Monomer THIO1 (polythiol) | pentaerythritol tetrakis (3-mercaptopropionate) | 7575-23-7 | |
| Monomer THIO2 (polythiol) | 1,2-bis[(2-mercaptoethyl) thio]-3-mercaptopropane | 131538-00-6 | |
| Monomer ISO2 (diisocyanate) | xylylene diisocyanate | 3634-83-1 | |
| Catalyst | Dimethyltin dichloride (DMC) | 753-73-1 | Honjo Chemical |
| Mold release agent | Zelec ® UN | — | Stepan Company |

| Function | Chemical | CAS No. | Supplier |
|---|---|---|---|
| UV Absorber (benzotriazole) | Seesorb ® 703 | 3896-11-6 | Shipro Kasei Kaisha |
| UV Absorber (benzotriazole) | Seesorb ® 709 | 3147-75-9 | Shipro Kasei Kaisha |
| UV Absorber (benzotriazole) | Seesorb ® 701 | 2440-22-4 | Shipro Kasei Kaisha |
| UV Absorber (benzotriazole) | Eversorb ® 109 | 83044-89-7 83044-90-0 | Everlight Chemical |
| UV Absorber (benzotriazole) | Sunsorb ® 327 | 3864-99-1 | Everspring Chemical |
| UV Absorber (benzotriazole) | Tinuvin ® 928 | 73936-91-1 | BASF |
| Light stabilizer | Tinuvin ® 144 | 63843-89-0 | BASF |

Example 1: Preparation of Oxazolone (IVa)

(IVa)

Preparation of 4-(4,6-dimethoxy-1,3,5-triazin-2-yl)-4-methylmorpholin-4-ium chloride (3)

To a solution of 2-chloro-4,6-dimethoxy-1,3,5-triazine (1) (4 g, 0.23 mol) in THF (200 ml), morpholine (2) (3.4 ml, 0.031 mol) was added dropwise. The reaction was stirred at room temperature (20-25° C.) for 2 h. The resulting suspension was filtered and the solid was dried to yield 4-(4,6-dimethoxy-1,3,5-triazin-2-yl)-4-methylmorpholin-4-ium chloride (3) as an organic salt.

Preparation of Oxazolone (IVa)

2.7 g of hippuric acid (4a) (0.015 mol) was dissolved in THF (130 ml), followed by addition of salt (3) (0.015 mol). The mixture was stirred for 2 h at room temperature (20-25° C.). Subsequently, the reaction was charged with benzaldehyde (6a) (1.93 g, 0.014 mol) and THF (20 ml), then refluxed (75° C.) for 2 h. After cooling the mixture to room temperature, the remaining undissolved organic salts in the mixture were filtered off. The filtrate was then concentrated under vacuum and re-dissolved using EtOAc. It was washed with an aqueous solution of $Na_2CO_3$ and water, then dried over $Na_2SO_4$, filtered and evaporated under vacuum. Finally, the obtained solid was re-crystallized in acetone to afford oxazolone (IVa) as a yellowish crystal.

Example 2: Preparation of Oxazolone (IVb) to (IVk)

Oxazolone (IVb) to (IVk) were obtained according to example 1 by replacing benzaldehyde (6a) with the corresponding substituted benzaldehyde, as shown in table below.

|  | substituted benzaldehyde used in synthesis |
|---|---|
| oxazolone (IVb) | 4-chlorobenzaldehyde |
| oxazolone (IVc) | 3,4-dimethoxybenzaldehyde |
| oxazolone (IVd) | 4-fluorobenzaldehyde |
| oxazolone (IVe) | 4-hydroxybenzaldehyde |
| oxazolone (IVf) | 4-trifluoromethylbenzaldehyde |
| Oxazolone (IVg) | 3-chlorobenzaldehyde |
| Oxazolone (IVh) | 4-methoxybenzaldehyde |
| Oxazolone (IVj) | 4-dimethylaminobenzaldehyde |
| Oxazolone (IVk) | 4-nitrobenzaldehyde |

Example 3: Absorption Properties of Oxazolone (IVa)-(IVk)

Figure 1:
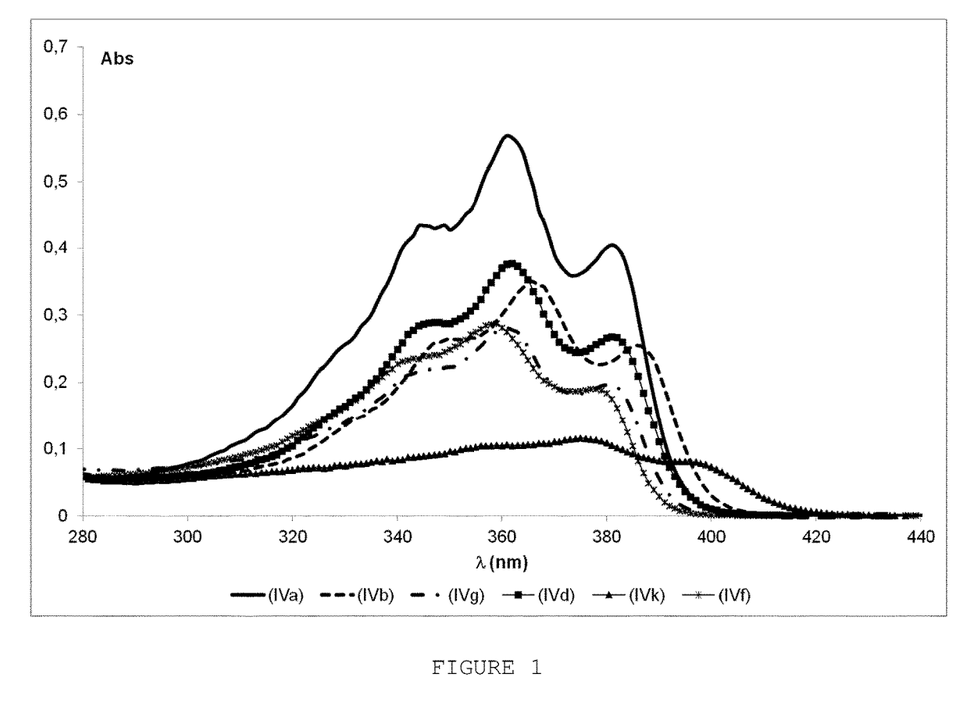
FIGS. 1 and 2 are graphs of absorbance (Abs) as a function of wavelength ($\lambda$, in nm) for a solution of 1 mg of oxazolone of formula (IVa) to (IVk) in 100 mL of ethanol.
Figure 2:
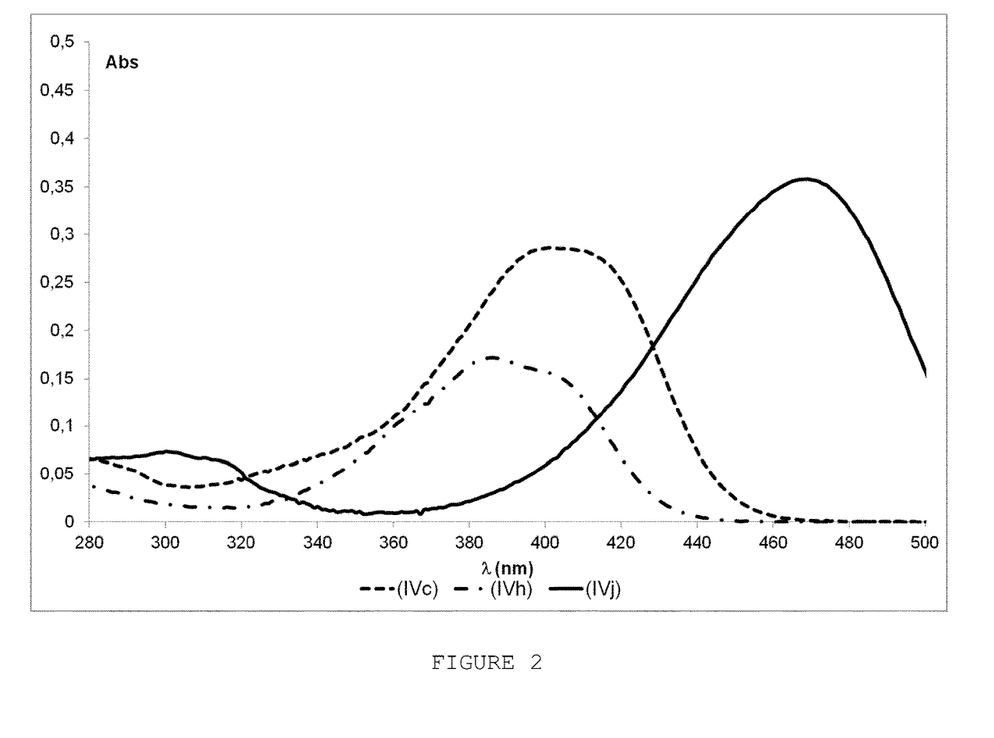

The absorbance (A) as a function of wavelength (A) was measured for a solution of 1 mg of oxazolone of formula (IVa) to (IVk) in 100 mL of ethanol (see FIGS. 1 and 2). The maximum absorption wavelength (Amax) for each oxazolone is given in the table below:

|  | Aldehyde used in synthesis | λmax (nm) |
|---|---|---|
| oxazolone (IVa) | benzaldehyde (unsubstituted) | 362 |
| oxazolone (IVb) | 4-chlorobenzaldehyde | 366 |
| oxazolone (IVc) | 3,4-dimethoxybenzaldehyde | 400 |
| oxazolone (IVd) | 4-fluorobenzaldehyde | 362 |
| oxazolone (IVe) | 4-hydroxybenzaldehyde | 383 |
| oxazolone (IVf) | 4-trifluoromethylbenzaldehyde | 359 |
| Oxazolone (IVg) | 3-chlorobenzaldehyde | 361 |
| Oxazolone (IVh) | 4-methoxybenzaldehyde | 383 |
| Oxazolone (IVj) | 4-dimethylaminobenzaldehyde | 469 |
| Oxazolone (IVk) | 4-nitrobenzaldehyde | 375 |

All compounds (except (IVj)) exhibit a maximum absorption wavelength (Amax) in the range of 350 to 400 nm. Indeed, these compounds may absorb UV-A and blue violet light, without imparting a yellow colour to ophthalmic lenses.

Compound (IVj) exhibits a maximum absorption wavelength at 469 nm, in the range of blue light associated with circadian rhythm: such compound may be used to prepare ophthalmic lenses that filter out blue light around 480 nm, adapted to shifted workers or travellers.

Example 4: Preparation of Compositions to Obtain an Ophthalmic Lens with Refractive Index 1.6

Formulae 1-12 according to the invention and Comparative Formulae Comp. 1-5 comprising the following ingredients were prepared. The values expressed in the tables below are weight percentages based on the total weight of the composition.

| Formula | 1 | 2 | 3 | 4 | 5 | 6 | 7 | 8 | 9 | 10 | 11 | 12 |
|---|---|---|---|---|---|---|---|---|---|---|---|---|
| ISO1 | 49.89 | 50.49 | 49.79 | 49.69 | 49.79 | 49.92 | 49.79 | 49.90 | 49.86 | 49.93 | 49.82 | 49.93 |
| THIO1 | 23.56 | 23.85 | 23.51 | 23.47 | 23.51 | 23.58 | 23.51 | 23.57 | 23.55 | 23.58 | 23.53 | 23.58 |
| THIO2 | 25.14 | 25.44 | 25.09 | 25.04 | 25.09 | 25.16 | 25.09 | 25.14 | 25.13 | 25.16 | 25.11 | 25.16 |
| DMC | 0.039 | 0.040 | 0.039 | 0.039 | 0.039 | 0.039 | 0.039 | 0.039 | 0.039 | 0.039 | 0.039 | 0.039 |
| Seesorb ® 709 | 1.184 | — | 1.184 | 1.184 | 1.184 | 1.184 | 1.184 | 1.184 | 1.184 | 1.184 | 1.181 | 1.184 |
| Seesorb ® 703 | 0.012 | — | 0.012 | 0.012 | 0.012 | 0.012 | 0.012 | 0.012 | 0.012 | 0.012 | 0.012 | 0.012 |
| Zelec ® UN | 0.069 | 0.070 | 0.069 | 0.069 | 0.069 | 0.069 | 0.069 | 0.069 | 0.069 | 0.069 | 0.069 | 0.079 |
| Oxazolone (IVa) | 0.099 | 0.100 | 0.295 | 0.491 | — | — | — | — | — | — | — | — |
| Oxazolone (IVb) | — | — | — | — | 0.295 | 0.025 | — | — | — | — | — | — |
| Oxazolone (IVc) | — | — | — | — | — | — | 0.295 | — | — | — | — | — |
| Oxazolone (IVd) | — | — | — | — | — | — | — | 0.074 | — | — | — | — |
| Oxazolone (IVg) | — | — | — | — | — | — | — | — | 0.142 | — | — | — |
| Oxazolone (IVh) | — | — | — | — | — | — | — | — | — | 0.006 | — | — |
| Oxazolone (IVf) | — | — | — | — | — | — | — | — | — | — | 0.246 | — |
| Oxazolone (IVj) | — | — | — | — | — | — | — | — | — | — | — | 0.0069 |
| Total | 100 | 100 | 100 | 100 | 100 | 100 | 100 | 100 | 100 | 100 | 100 | 100 |

| Formula | Comp. 1 | Comp. 2 | Comp. 3 | Comp. 4 | Comp. 5 |
|---|---|---|---|---|---|
| ISO1 | 49.940 | 50.045 | 50.278 | 49.313 | 49.554 |
| THIO1 | 23.588 | 23.638 | 23.748 | 23.292 | 23.406 |
| THIO2 | 25.167 | 25.220 | 25.268 | 24.851 | 24.973 |
| DMC | 0.039 | 0.040 | 0.040 | 0.039 | 0.039 |
| Seesorb ® 709 | 1.184 | — | — | — | — |
| Seesorb ® 703 | 0.012 | — | — | — | 1.959 |
| Zelec ® UN | 0.069 | 0.069 | 0.070 | 0.068 | 0.069 |
| Eversorb ® 109 | — | 0.989 | — | — | — |
| Sunsorb ® 327 | — | — | 0.596 | — | — |
| Tinuvin ® 928 | — | — | — | 2.436 | — |
| Total | 100 | 100 | 100 | 100 | 100 |

The compositions were prepared according to the following steps:
1. oxazolone and/or UV absorbers were dissolved in ISO1 or THIO2;
2. DMC and Zelec® UN were mixed with ISO1 in a Duran bottle (100 ml) at room temperature (20-25° C.) under vacuum until homogeneous;
3. the mixture was cooled down to 20° C. before vacuum was released and replaced with $N_2$;
4. THIO 1 and THIO2 were added in the mixture;
5. the mixture was stirred under vacuum at 20° C. until homogeneous.

Example 5: Preparation of Ophthalmic Lens with Refractive Index 1.6

Formulae 1-12 according to the invention and Comparative Formulae Comp. 1-5 obtained according to Example 4 were polymerized to obtain an ophthalmic lens with the following steps:

1. a 71 mm diameter glass bi-plano mold was filled with the composition using a syringe;
2. polymerization was carried out in a regulated electronic oven in which the temperature was gradually increased from 15° C. to 130° C. in 16 hours then kept constant at 130° C. for 4 hours;
3. the mold was then disassembled and the resulting lens had a 2 mm thickness in its center.

The characteristics of the ophthalmic lens are given in the following tables:

| Formula | light cut (nm) | TvD65 (%) | TmB1 (%) | TmB2 (%) |
|---|---|---|---|---|
| 1 | 408 | 89.72 | 83.08 | 89.25 |
| 2 | 407 | 89.37 | 83.56 | 88.86 |
| 3 | 412 | 89.30 | 76.31 | 88.86 |
| 4 | 415 | 89.33 | 71.41 | 88.81 |
| 5 | 417 | 89.11 | 63.36 | 88.54 |
| 6 | 406 | 89.64 | 83.74 | 89.26 |
| 7 | 469 | 85.89 | 0.01 | 38.81 |
| 8 | 407 | 89.13 | 83.47 | 88.65 |
| 9 | 407 | 89.09 | 83.66 | 88.64 |
| 10 | 408 | 89.26 | 37.67 | 88.95 |
| 11 | 406 | 89.10 | 82.95 | 88.62 |
| 12 | 493 | 66.78 | 10.36 | 0.84 |
| Comp. 1 | 396 | 89.62 | 88.06 | 89.34 |
| Comp. 2 | 407 | 89.34 | 80.80 | 89.00 |
| Comp. 3 | 408 | 89.49 | 79.50 | 89.21 |

-continued

| Formula | light cut (nm) | TvD65 (%) | TmB1 (%) | TmB2 (%) |
|---|---|---|---|---|
| Comp. 4 | 408 | 90.35 | 82.32 | 90.07 |
| Comp. 5 | 418 | 21.22 | 11.40 | 17.80 |

| Formula | YI | L* | a* | b* | C* | h* |
|---|---|---|---|---|---|---|
| 1 | 5.33 | 95.82 | −2.24 | 4.65 | 5.16 | 115.70 |
| 2 | 5.06 | 95.68 | −2.08 | 4.35 | 4.83 | 115.60 |
| 3 | 7.83 | 95.62 | −3.41 | 6.87 | 7.67 | 116.40 |
| 4 | 9.70 | 95.62 | −4.10 | 8.35 | 9.30 | 116.15 |
| 5 | 12.66 | 95.50 | −5.13 | 10.58 | 11.76 | 115.90 |
| 6 | 4.85 | 95.79 | −2.09 | 4.27 | 4.75 | 116.10 |
| 7 | 89.64 | 92.93 | −19.48 | 97.89 | 99.81 | 101.30 |
| 8 | 5.02 | 95.58 | −2.07 | 4.33 | 4.80 | 115.50 |
| 9 | 4.86 | 95.56 | −1.98 | 4.17 | 4.62 | 115.40 |
| 10 | 25.27 | 95.47 | −9.23 | 20.06 | 22.08 | 114.70 |
| 11 | 5.04 | 95.57 | −1.99 | 4.22 | 4.67 | 115.25 |
| 12 | 121.24 | 82.90 | 19.37 | 91.25 | 93.29 | 78.00 |
| Comp. 1 | 2.16 | 95.82 | −0.69 | 1.56 | 1.70 | 113.75 |
| Comp. 2 | 5.83 | 95.66 | −2.56 | 5.16 | 5.76 | 116.40 |
| Comp. 3 | 6.33 | 95.72 | −2.81 | 5.60 | 6.26 | 116.65 |

-continued

| Formula | YI | L* | a* | b* | C* | h* |
|---|---|---|---|---|---|---|
| Comp. 4 | 5.55 | 96.08 | −2.50 | 4.97 | 5.57 | 116.63 |
| Comp. 5 | 37.60 | 52.81 | −0.03 | 14.40 | 14.40 | 90.13 |

According to above results, at the same light cut level either at around 407 or 418 nm, lenses comprising an oxazolone according to the invention displayed superior properties, i.e. lower YI, b* and c*, relative to those of lens comprising only a benzotriazole UV absorber. For instance, formulae 1, 2, 8 and 9 have a similar light Cut with Comp. formulae 2, 3 and 4, but their YI is lower than 5.3, sometimes around 5, as compared to YI higher than 5.5, sometimes around 6. Comparison of formulae 4 and 5 with comparative formula 5 demonstrates the same difference: similar light Cut but with lower YI.

Further, since oxazolone has a high absorption coefficient, the required amount of oxazolone to reach this light cut was much less than the amount needed of a conventional benzotriazole UV absorber.

The light cut, yellow index and transmittance (TvD65) measured immediately after manufacture (t=0) and after accelerated ageing in Q-Sun cell (t=80) for the lens obtained with Formula 1, 2, and 5 to 10 are given in the table below:

| Formula | light cut t = 0 (nm) | light cut t = 80 (nm) | Δlight cut t = 80 (%) | YI t = 0 | YI t = 80 | ΔYI t = 80 (%) | TvD65 t = 0 (%) | TvD65 t = 80 (%) | ΔTvD65 t = 80 (%) |
|---|---|---|---|---|---|---|---|---|---|
| 1 | 408 | 406 | −0.49 | 5.33 | 6.23 | 16.89 | 89.72 | 88.93 | −0.88 |
| 2 | 407 | 406 | −0.25 | 5.06 | 9.81 | 93.87 | 89.37 | 87.02 | −2.63 |
| 5 | 417 | 415 | −0.48 | 12.66 | 15.69 | 23.93 | 89.11 | 86.71 | −2.69 |
| 6 | 406 | 399 | −1.72 | 4.85 | 4.29 | −11.55 | 89.64 | 89.28 | −0.40 |
| 7 | 469 | 465 | −0.85 | 89.64 | 85.32 | −4.82 | 85.89 | 86.31 | 0.49 |
| 8 | 407 | 405 | −0.49 | 5.02 | 5.57 | 10.96 | 89.13 | 88.82 | −0.35 |
| 9 | 407 | 403 | −0.98 | 4.86 | 10.57 | 117.49 | 89.09 | 86.12 | −3.33 |
| 10 | 408 | 402 | −1.47 | 25.27 | 21.26 | −15.87 | 89.26 | 88.37 | −1.00 |

The light cut and the transmittance of the lens are relatively stable upon aging. The lens obtained with Formula 1 comprising a mixture of oxazolone and benzotriazole UV-absorbers exhibits significantly less increase in Yellow Index compared to that of the lens obtained with Formula 2 comprising an oxazolone only. The lens obtained with Formula 6 comprising a reduced amount of oxazolone exhibits a lower light cut and significantly less increase in Yellow Index compared to that of the lens obtained with Formula 5 comprising more than 10 times more oxazolone.

Formulae 7 and 12 yield an ophthalmic lens which is actually an efficient filter in blue area, i.e. a very coloured yellow lens.

Example 6: Preparation of Compositions to Obtain an Ophthalmic Lens with Refractive Index 1.67

Formulae 20-27 according to the invention and Comparative Formula Comp. 6 comprising the following ingredients were prepared. The values expressed in the table below are weight percentages based on the total weight of the composition.

| Formula | 20 | 21 | 22 | 23 | 24 | 25 | 26 | 27 | Comp. 6 |
|---|---|---|---|---|---|---|---|---|---|
| ISO2 | 52.03 | 52.01 | 51.38 | 51.36 | 51.00 | 51.36 | 51.37 | 51.34 | 51.06 |
| THIO2 | 47.87 | 47.85 | 47.27 | 47.26 | 46.91 | 47.23 | 47.27 | 47.24 | 46.98 |
| DMC (ppm) | 0.01 | 0.01 | 0.01 | 0.010 | 0.010 | 0.010 | 0.010 | 0.010 | 0.01 |
| Zelec(ppm) | 0.08 | 0.08 | 0.10 | 0.099 | 0.078 | 0.079 | 0.079 | 0.079 | 0.08 |
| Seesorb ® 709 | – | – | – | – | – | – | – | – | 1.67 |
| Seesorb ® 703 | – | – | – | – | – | – | – | – | 0.20 |
| Oxazolone (IVb) | 0.01 | 0.05 | 0.01 | – | – | – | – | – | – |
| Oxazolone (IVa) | – | – | – | 0.030 | 0.029 | 0.030 | – | – | – |
| Oxazolone (IVd) | – | – | – | – | – | – | 0.030 | – | – |
| Oxazolone (IVf) | – | – | – | – | – | – | – | 0.099 | – |
| Seesorb ® 701 | – | – | 1.23 | 1.233 | 1.959 | 1.233 | 1.233 | 1.232 | – |
| Tinuvin ® 144 | – | – | – | – | – | 0.049 | – | – | – |
| Total | 100 | 100 | 100 | 100 | 100 | 100 | 100 | 100 | 100 |

The compositions were prepared according to the following steps:
1. oxazolone and/or UV absorbers were dissolved in ISO2 or THIO2;
2. DMC and Zelec® UN were mixed with ISO2 in a Duran bottle (100 ml) at room temperature (20-25° C.) under vacuum until homogeneous;
3. the mixture was cooled down to 20° C. before vacuum was released and replaced with $N_2$;
4. THIO2 was added in the mixture;
5. the mixture was stirred under vacuum at 20° C. until homogeneous.

Example 7: Preparation of Ophthalmic Lens with Refractive Index 1.67

Formulae 20-27 according to the invention and Comparative Formula Comp. 6 obtained according to Example 6 were polymerized to obtain an ophthalmic lens with the following steps:
1. a 71 mm diameter glass bi-plano mold was filled with the composition using a syringe;
2. polymerization was carried out in a regulated electronic oven in which the temperature was gradually increased from 20° C. to 120° C. in 14.5 hours then kept constant at 120° C. for 3 hours;
3. the mold was then disassembled and the resulting lens had a 2 mm thickness in its center.

The characteristics of the ophthalmic lens are given in the following tables:

| Formula | light cut (nm) | TvD65 (%) | TmB1 (%) | TmB2 (%) |
|---|---|---|---|---|
| 20 | 406 | 88.05 | 81.00 | 87.77 |
| 21 | 415 | 88.05 | 68.56 | 87.74 |
| 22 | 407 | 87.96 | 80.7 | 87.8 |
| 23 | 408 | 88.19 | 80.55 | 87.36 |
| 24 | 408 | 88.14 | 79.74 | 87.35 |
| 25 | 407 | 87.85 | 81.23 | 87.29 |
| 26 | 408 | 87.39 | 80.49 | 86.96 |
| 27 | 408 | 87.26 | 78.65 | 86.66 |
| Comp. 6 | 408 | 87.79 | 76.98 | 87.71 |

| Formula | YI | L* | a* | b* | C* | h* |
|---|---|---|---|---|---|---|
| 20 | 5.30 | 95.12 | −2.24 | 4.64 | 5.16 | 115.80 |
| 21 | 9.53 | 95.08 | −4.06 | 8.23 | 9.18 | 116 |
| 22 | 5.36 | 95.08 | −2.27 | 4.69 | 5.21 | 116 |
| 23 | 5.03 | 95.18 | −2.12 | 4.40 | 4.89 | 115.80 |
| 24 | 5.58 | 95.15 | −2.38 | 4.89 | 5.44 | 116.00 |
| 25 | 5.01 | 95.04 | −2.12 | 4.37 | 4.86 | 115.83 |
| 26 | 5.47 | 94.84 | −2.31 | 4.77 | 5.30 | 115.80 |
| 27 | 6.43 | 94.78 | −2.53 | 5.39 | 5.95 | 115.15 |
| Comp. 6 | 6.98 | 94.99 | −2.77 | 5.89 | 6.51 | 116 |

According to above results, at the same light cut level either at around 407, lenses comprising an oxazolone according to the invention displayed superior properties, i.e. lower YI, b* and c*, relative to those of lens comprising only a benzotriazole UV absorber. For instance, formulae 22 to 26 have a similar light cut to that of formula Comp. 6, but their YI is lower than 5.3, sometimes around 5.6, as compared to a higher YI around 7.

Further, since oxazolone has a high absorption coefficient, the required amount of oxazolone to reach this light cut was much less than the amount needed of a conventional benzotriazole UV absorber.

The light cut, yellow index and transmittance (TvD65) measured immediately after manufacture (t=0) and after accelerated ageing in Q-Sun cell (t=80) for the lens obtained with Formula 20-26 and Comp. 6 are given in the table below:

| Formula | light cut t = 0 (nm) | light cut t = 80 (nm) | Δlight cut t = 80 (%) | YI t = 0 | YI t = 80 | ΔYI t = 80 (%) | TvD65 t = 0 (%) | TvD65 t = 80 (%) | ΔTvD65 t = 80 (%) |
|---|---|---|---|---|---|---|---|---|---|
| 20 | 406 | 301 | −25.86 | 5.30 | 7.79 | 46.98 | 88.05 | 85.44 | −2.96 |
| 21 | 415 | 380 | −8.43 | 9.53 | 18.42 | 93.28 | 88.05 | 81.75 | −7.16 |
| 22 | 407 | 399 | −1.97 | 5.36 | 3.62 | −32.46 | 87.96 | 87.57 | −0.44 |

-continued

| Formula | light cut t = 0 (nm) | light cut t = 80 (nm) | Δlight cut t = 80 (%) | YI t = 0 | YI t = 80 | ΔYI t = 80 (%) | TvD65 t = 0 (%) | TvD65 t = 80 (%) | ΔTvD65 t = 80 (%) |
|---|---|---|---|---|---|---|---|---|---|
| 23 | 408 | 402 | −1.47 | 5.03 | 5.10 | 1.39 | 88.19 | 87.51 | −0.77 |
| 24 | 408 | 404 | −1.06 | 5.58 | 5.25 | −5.85 | 88.14 | 87.28 | −0.97 |
| 25 | 407 | 403 | −1.05 | 5.01 | 5.59 | 11.62 | 87.85 | 87.16 | −0.78 |
| 26 | 408 | 401 | −1.72 | 5.47 | 4.59 | −16.09 | 87.39 | 86.35 | −1.19 |
| Comp. 6 | 408 | 408 | 0.00 | 6.98 | 7.01 | 0.43 | 87.79 | 87.73 | −0.07 |

The lens obtained with Formula 22 comprising a mixture of oxazolone and benzotriazole UV-absorber exhibits a significant decrease in Yellow Index upon aging compared to the lens obtained with Formula comprising an oxazolone only which exhibits an increase of Yellow Index upon aging.

Addition of a light stabilizer in Formula 25 lowers the degradation of light cut during ageing in Q-Sun cell: light cut is reduced of 4 nm, whereas the same composition, but without light stabilizer (Formula 23) shows a light cut reduction of 6 nm. Comparison with Formula 24 shows that a very low amount of light stabilizer (0.05%) has a similar effect than an increase of UV absorber (from 1.23% to 1.95%). Finally, combination of oxazolone with UV absorber and light stabilizer provides a very efficient lens with low amounts of additives.

Example 8: Preparation of Ophthalmic Lens with Refractive Index 1.50

The ophthalmic lens prepared in example 8 comprises a plastic base having a refractive index of 1.50 (ORMA® from Essilor, a copolymer based on diethylene glycol bis (allyl carbonate)), using imbibition method.

A solution containing 0.8 g of oxazolone (IVa) and 0.2 g of Sodium dodecylbenzenesulfonate is prepared in soft water (qsp 100 g). The solution is heated at 95° C.

The plastic base is soaked in said solution. The imbibition time is 10-15 minutes, depending on the desired light cut. The higher the desired light cut, the longer the imbibition time.

Then, the ophthalmic lens is withdrawn from the bath, laid on a tray and placed in an oven for 1 hour at 100° C.±3° C.

Light cuts ranging from 390 nm to 400 nm were obtained.

The invention claimed is:
1. An ophthalmic lens comprising:
a plastic base; and
an oxazolone,
wherein the oxazolone is represented by formula (I):

wherein

A is a 5-membered ring selected from one of the following:

each $R_1$ is independently selected from the group consisting of halogen, $(C_{1-6})$alkyl, $(C_{1-6})$haloalkyl, —OH, —OR, —NH$_2$, —NH($(C_{1-6})$alkyl), —N($(C_{1-6})$alkyl)$_2$, —NO$_2$, —CN, —NH—C(O)—$(C_{1-6})$alkyl and —O—C(O—$(C_{1-6})$alkyl;

each $R_2$ is independently selected from the group consisting of halogen, $(C_{1-6})$alkyl, $(C_{1-6})$haloalkyl, —OH, —OR, —NH$_2$, —NH($(C_{1-6})$alkyl), —N($(C_{1-6})$alkyl)$_2$, —NO$_2$, —CN, —NH—C(O)—$(C_{1-6})$alkyl and —O—C(O—$(C_{1-6})$alkyl;

R is $(C_{1-6})$alkyl or $(C_{1-6})$haloalkyl;

n is 0, 1, 2, 3, 4 or 5; and m is 0, 1, 2, 3, 4 or 5.

2. The ophthalmic lens of claim 1, wherein each $R_1$ is independently selected from the group consisting of Cl, Br, F, —CF3, —OH, —OCH$_3$, —NH$_2$, —N(CH$_3$)$_2$, —CH$_3$, —C$_2$H$_5$, —NO$_2$, —CN, and —O—C(O)—CH$_3$.

3. The ophthalmic lens of claim 1, wherein each $R_2$ is independently selected from the group consisting of Cl, Br, F, —CF3, —OH, —OCH$_3$, —NH$_2$, —N(CH$_3$)$_2$, —CH$_3$, —C$_2$H$_5$, —NO$_2$, —CN, and —O—C(O)—CH$_3$.

4. The ophthalmic lens of claim 1, wherein the oxazolone is represented by formula (II) or (III):

(II)

(III)

wherein $R_1$, $R_2$, n and m are as defined in claim 1.

5. The ophthalmic lens of claim 1, wherein:

each $R_2$ is independently selected from the group consisting of Cl, F, —$CF_3$, $NO_2$, —OH and —$OCH_3$;

n is 0; and m is 0, 1 or 2.

6. The ophthalmic lens of claim 5, wherein each $R_2$ is independently selected from the group consisting of Cl, F and $CF_3$.

7. The ophthalmic lens of claim 1, wherein the oxazolone is represented by one of the following formula (IVa)-(IVk):

(IVa)

(IVb)

(IVc)

(IVd)

(IVe)

(IVf)

(IVg)

8. The ophthalmic lens of claim 1, wherein the stereochemistry of the carbon-carbon double bond in the oxazolone is (Z).

9. The ophthalmic lens of claim 1, wherein the oxazolone has a maximum absorption wavelength (λmax) lower than 400 nm, as measured on a 10 ppm solution of oxazolone in ethanol.

10. The ophthalmic lens of claim 1, wherein the oxazolone is included in the plastic base or is included in a separate layer coated on a surface of the plastic base.

11. The ophthalmic lens of claim 1, wherein the oxazolone is encapsulated within nanoparticles.

12. The ophthalmic lens of claim 1, wherein the amount of oxazolone is 0.001 to 5% by weight based on the weight of the plastic base when the oxazolone is included in the plastic base or on the weight of a separate layer when the oxazolone is included in a separate layer coated on a surface of the plastic base.

13. The ophthalmic lens of claim 1, wherein the ophthalmic lens further comprises a benzotriazole UV-absorber or a mixture thereof.

14. The ophthalmic lens of claim 13, wherein the benzotriazole UV-absorber is selected from the group consisting of 2-(2-hydroxy-5-tert-octylphenyl)-2H-benzotriazole, 2-(3-tert-butyl-2-hydroxy-5-methylphenyl)-5-chloro-2H-benzotriazole, and mixtures thereof.

15. The ophthalmic lens of claim 13, wherein the total amount of benzotriazole UV-absorber is 0.001 to 2% by weight based on the weight of the plastic base.

16. The ophthalmic lens of claim 1, wherein a light cut of the ophthalmic lens is higher than 402 nm.

17. The ophthalmic lens of claim 1, wherein a Yellow Index of light transmitted through said ophthalmic lens is lower than 10.

18. The ophthalmic lens of claim 1, wherein an average transmittance of the ophthalmic lens over the range 420-450 nm is less than 85%, wherein the average transmittance is measured on a bare lens.

19. A process for preparing the ophthalmic lens of claim 1, comprising the steps of:
 a) providing monomers or oligomers from which the plastic base can be prepared;
 b) mixing the monomers or oligomers, the oxazolone and a catalyst suitable for the polymerization of the monomers and oligomers to form a polymerizable liquid composition;
 c) curing the polymerizable liquid composition.

20. A method of absorbing blue light comprising:
 a) obtaining an ophthalmic lens comprising an oxazolone as defined in claim 1;
 b) positioning the lens in a position where it absorbs blue light.

* * * * *

UNITED STATES PATENT AND TRADEMARK OFFICE
CERTIFICATE OF CORRECTION

| | | |
|---|---|---|
| PATENT NO. | : 12,282,138 B2 | Page 1 of 1 |
| APPLICATION NO. | : 17/312469 | |
| DATED | : April 22, 2025 | |
| INVENTOR(S) | : Supitchaya Iamsaard and Pierre Fromentin | |

It is certified that error appears in the above-identified patent and that said Letters Patent is hereby corrected as shown below:

In the Claims

Claim 1, Column 24, Line 49:
Replace "–O-C(O-(C1-6)alkyl" with -- –O-C(O)-(C1-6)alkyl--.

Claim 1, Column 24, Line 54:
Replace "–O-C(O-(C1-6)alkyl" with -- –O-C(O)-(C1-6)alkyl--.

Signed and Sealed this
First Day of July, 2025

Coke Morgan Stewart
*Acting Director of the United States Patent and Trademark Office*